J. L. GUERRANT.
FREIGHT CAR DOOR.
APPLICATION FILED MAR. 30, 1916.

1,226,207.

Patented May 15, 1917.
9 SHEETS—SHEET 1.

Witnesses

J. L. Guerrant
Inventor,
by C. A. Snow & Co.
Attorneys.

J. L. GUERRANT.
FREIGHT CAR DOOR.
APPLICATION FILED MAR. 30, 1916.

1,226,207.

Patented May 15, 1917.
9 SHEETS—SHEET 2.

Witnesses

J. L. Guerrant
Inventor,
by C. A. Snow & Co.
Attorneys.

J. L. GUERRANT.
FREIGHT CAR DOOR.
APPLICATION FILED MAR. 30, 1916.

1,226,207.

Patented May 15, 1917.
9 SHEETS—SHEET 3.

Witnesses

J. L. Guerrant
Inventor,
by
Attorneys.

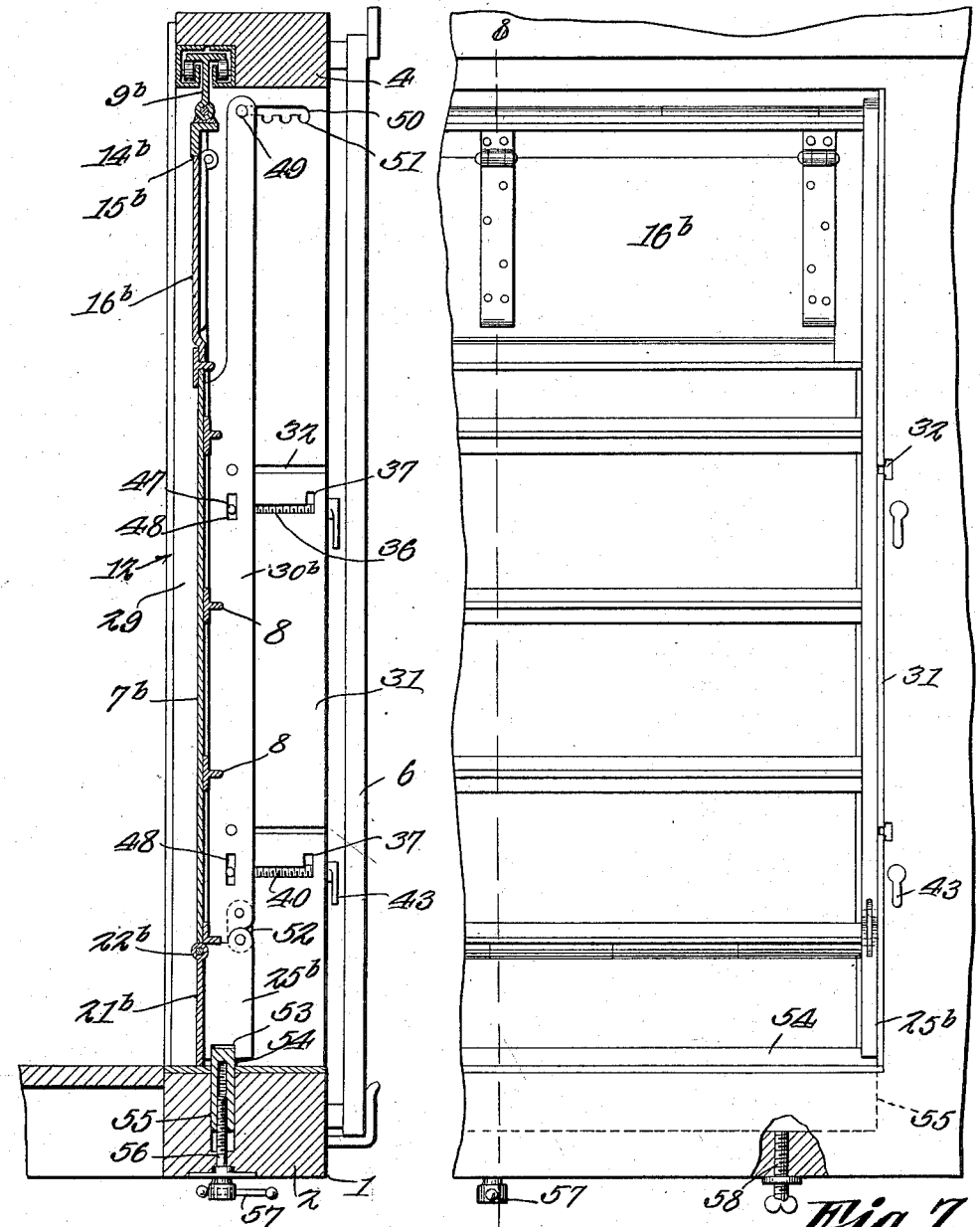

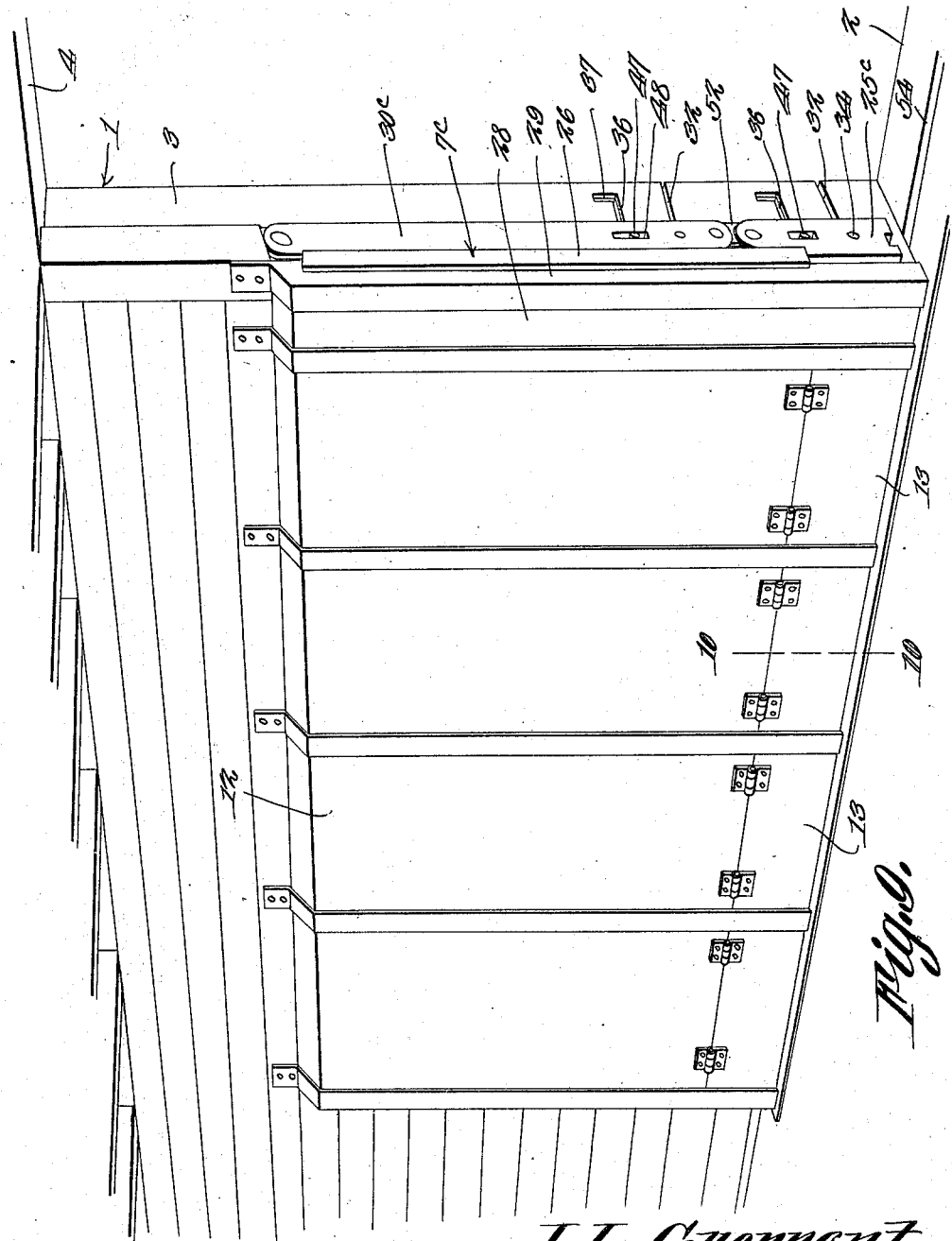

J. L. GUERRANT.
FREIGHT CAR DOOR.
APPLICATION FILED MAR. 30, 1916.

1,226,207.

Patented May 15, 1917.
9 SHEETS—SHEET 6.

J. L. Guerrant
Inventor, by C. A. Snow & Co.
Attorneys

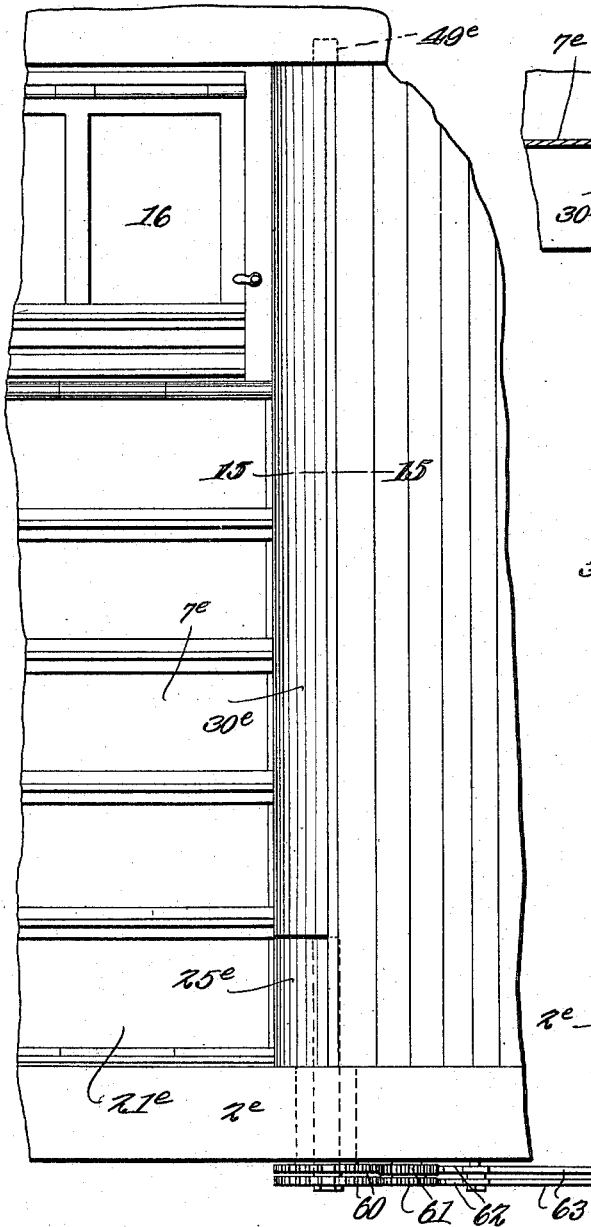

J. L. GUERRANT.
FREIGHT CAR DOOR.
APPLICATION FILED MAR. 30, 1916.
1,226,207.
Patented May 15, 1917.
9 SHEETS—SHEET 8.
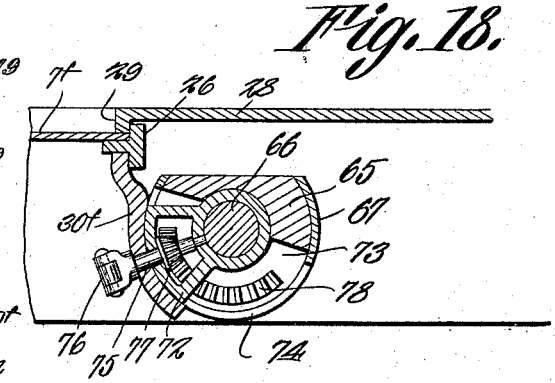
Fig. 18.
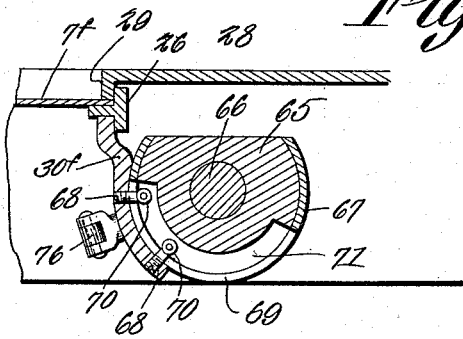
Fig. 19.
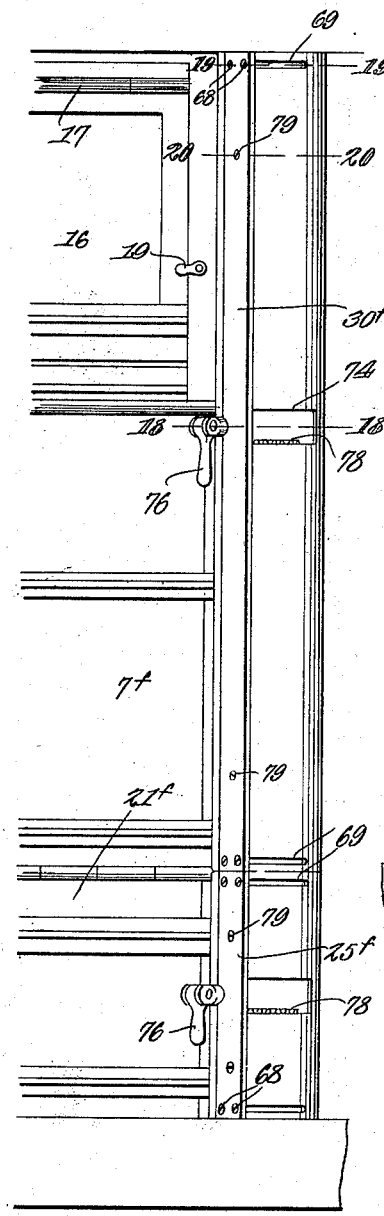
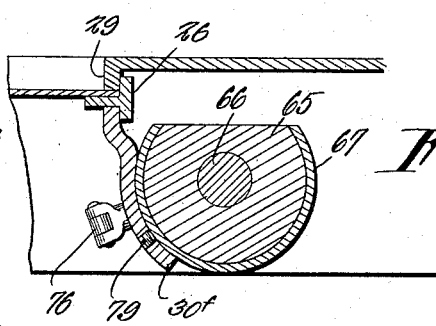
Fig. 20.
Fig. 17.
Witnesses
J. L. Guerrant
Inventor,
by C. A. Snow & Co.
Attorneys.

J. L. GUERRANT.
FREIGHT CAR DOOR.
APPLICATION FILED MAR. 30, 1916.
1,226,207.
Patented May 15, 1917.
9 SHEETS—SHEET 9.
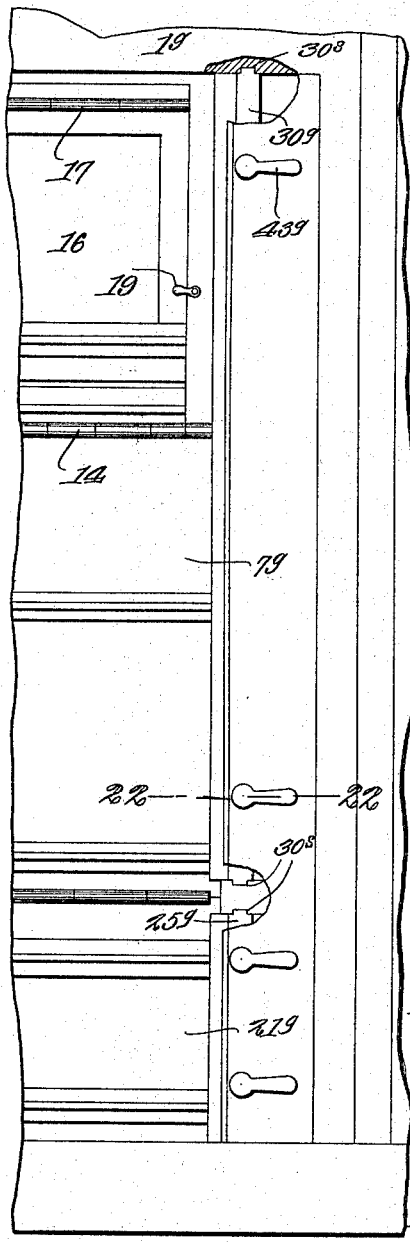
Fig. 21.
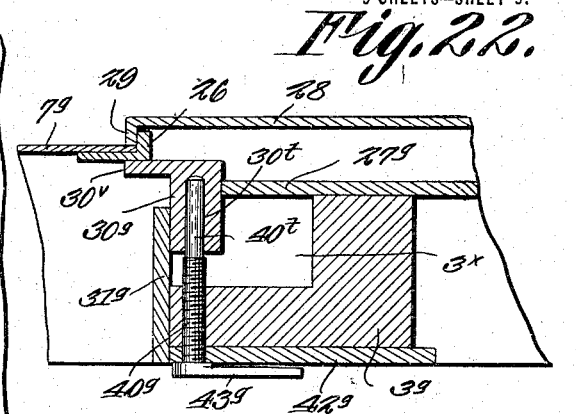
Fig. 22.
Fig. 23.
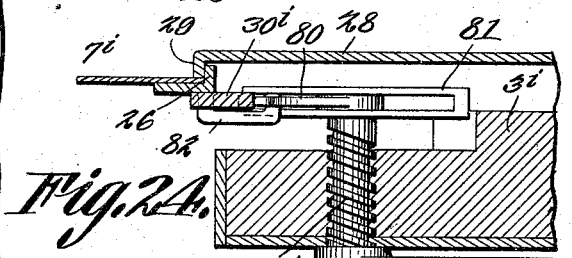
Fig. 24.
Fig. 25.
Witnesses
J. P. Tomley
R. L. Parker
J. L. Guerrant Inventor,
by C. A. Snow & Co.
Attorneys.

UNITED STATES PATENT OFFICE.

JOHN LAYTON GUERRANT, OF SEDALIA, MISSOURI.

FREIGHT-CAR DOOR.

1,226,207.    Specification of Letters Patent.    Patented May 15, 1917.

Application filed March 30, 1916.  Serial No. 87,771.

*To all whom it may concern:*

Be it known that I, JOHN LAYTON GUERRANT, a citizen of the United States, residing at Sedalia, in the county of Pettis and State of Missouri, have invented a new and useful Freight-Car Door, of which the following is a specification.

The present invention appertains to freight car doors, and aims to provide a novel and improved door construction for freight cars for use in conjunction with the ordinary outer door.

It is the object of the invention to provide an inner closure for the door way used in conjunction with the ordinary outer door, for retaining grain or other material or merchandise within the car body without danger of leakage or theft, the inner closure providing a perfect barrier, and it being impossible to open the inner closure from within the car, whereby a person hiding in the car when the doors are closed, cannot open the doors from the inside for the purpose of throwing out merchandise.

Another object of the invention is the provision of a door construction of the nature indicated having means for enabling the car to be readily filled with grain, or other material, and means permitting the grain or other material to be discharged or run out when it is desired to empty the car.

A still further object of the invention is the provision of novel and effective means for holding the various parts of the door in closed position, to prevent any possible leakage of the grain or other material, to prevent the door from being opened from the inside or from the outside when the ordinary outer door is closed, and to prevent the loosening or displacement of any of the parts due to the strains to which the door is subjected.

The present construction is such, that the door will not be injured by the pressure or jostling of the merchandise thereagainst, and that the door can be readily opened from the outside when the outer door is moved out of the way, the door yielding to the pressure of the merchandise thereagainst from within the car, whereby no difficulty will be encountered in opening the door even though the merchandise presses up against the door.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawings, wherein:—

Figure 1:
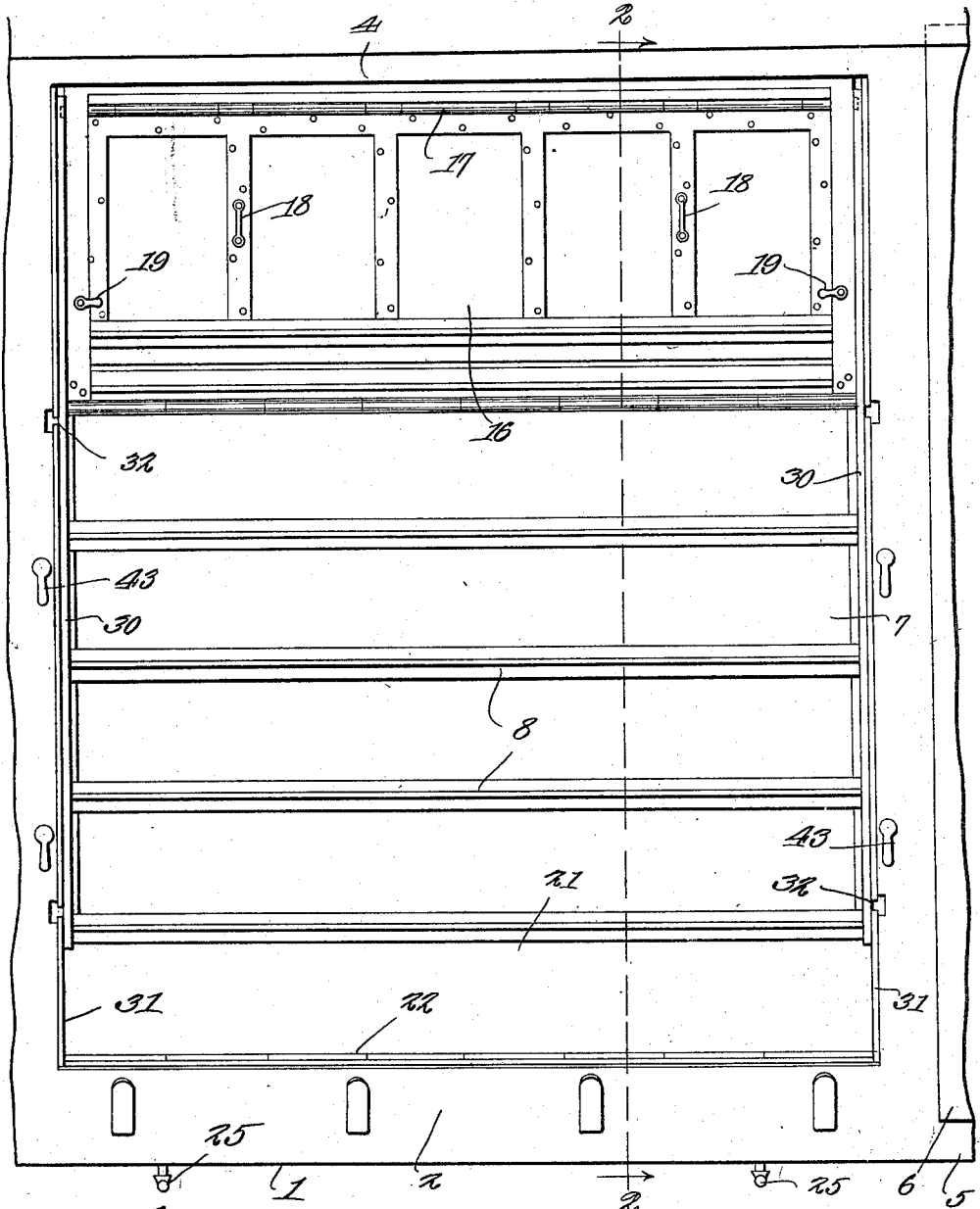
Figure 1 is an outside face view of the improved door construction, showing the door in closed position.
Figure 2:
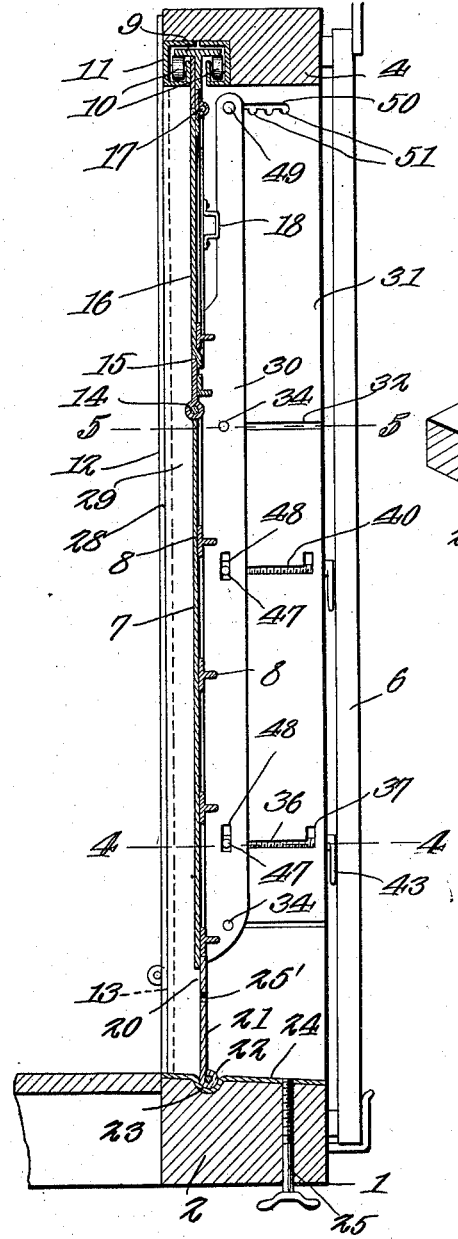
Fig. 2 is a vertical section taken on the line 2—2 of Fig. 1.
Figure 4:
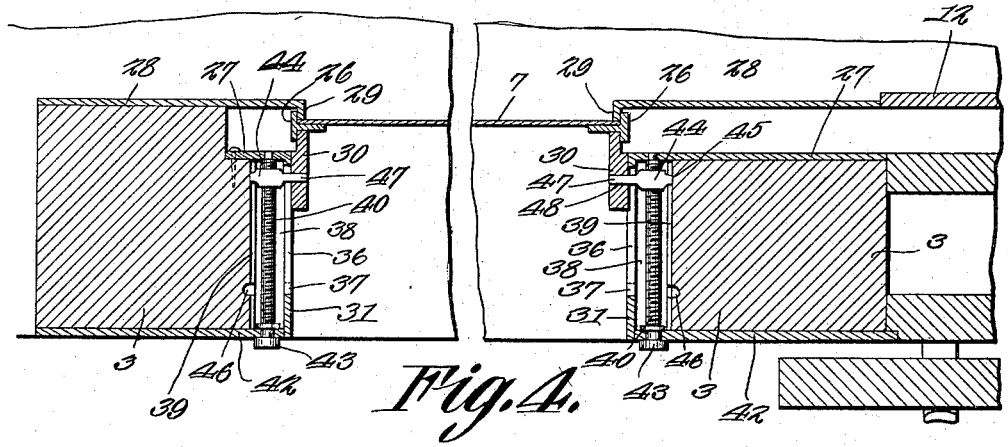
Figure 5:
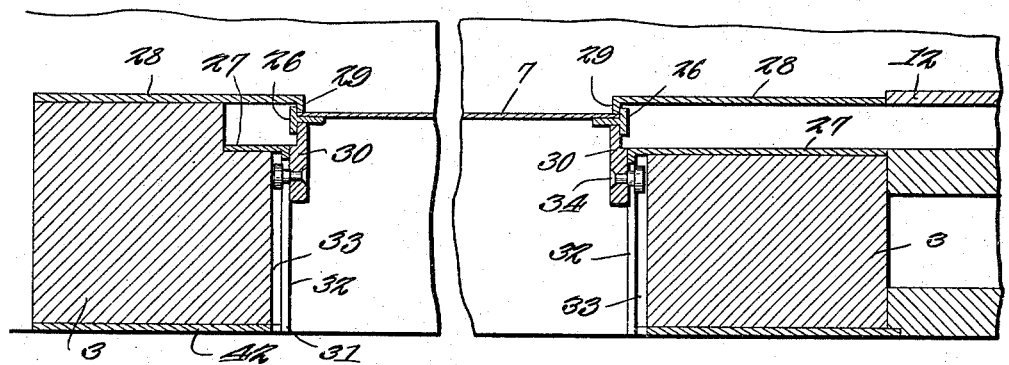

Figs. 4 and 5 are enlarged horizontal sections taken on the respective section lines 4—4 and 5—5 of Fig. 2, portions being broken away.

Figure 6:
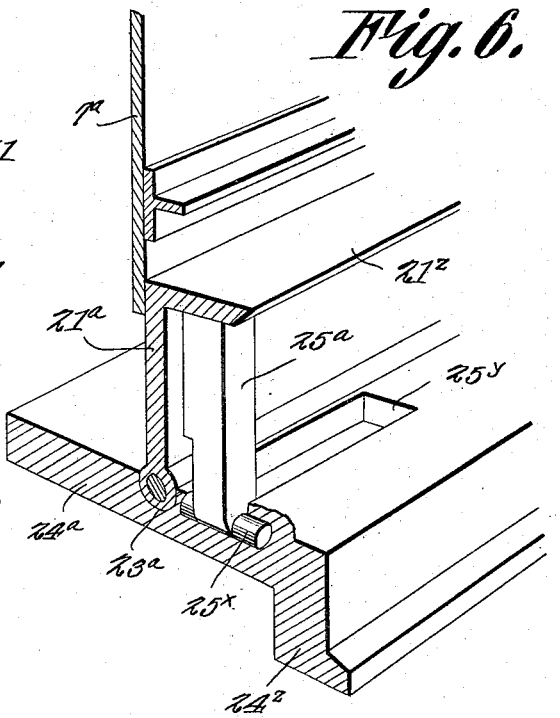
Figure 3:
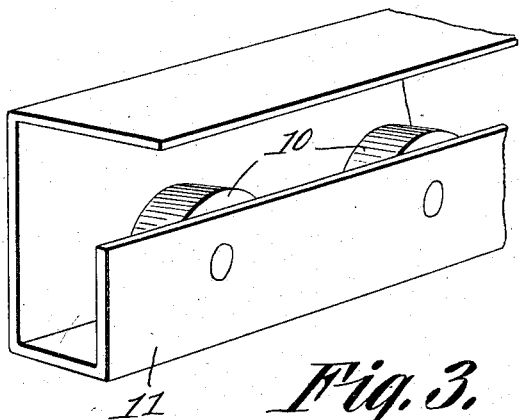
Fig. 3 is an enlarged fragmental perspective view of the track from which the door is hung.

Fig. 6 is a perspective view showing a modification.

Fig. 7 is a fragmental face view of a modified construction.

Fig. 8 is a vertical section taken on the line 8—8 of Fig. 7.

Fig. 9 is a perspective view illustrating the housing for the door, the door illustrated in this figure being of slightly modified construction.

Figure 10:
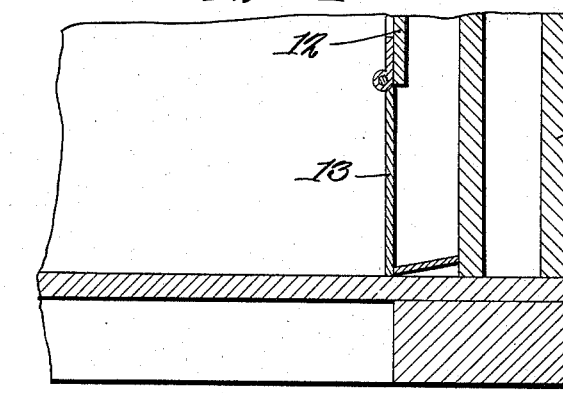

Fig. 10 is a sectional view taken on the line 10—10 of Fig. 9.

Figure 11:
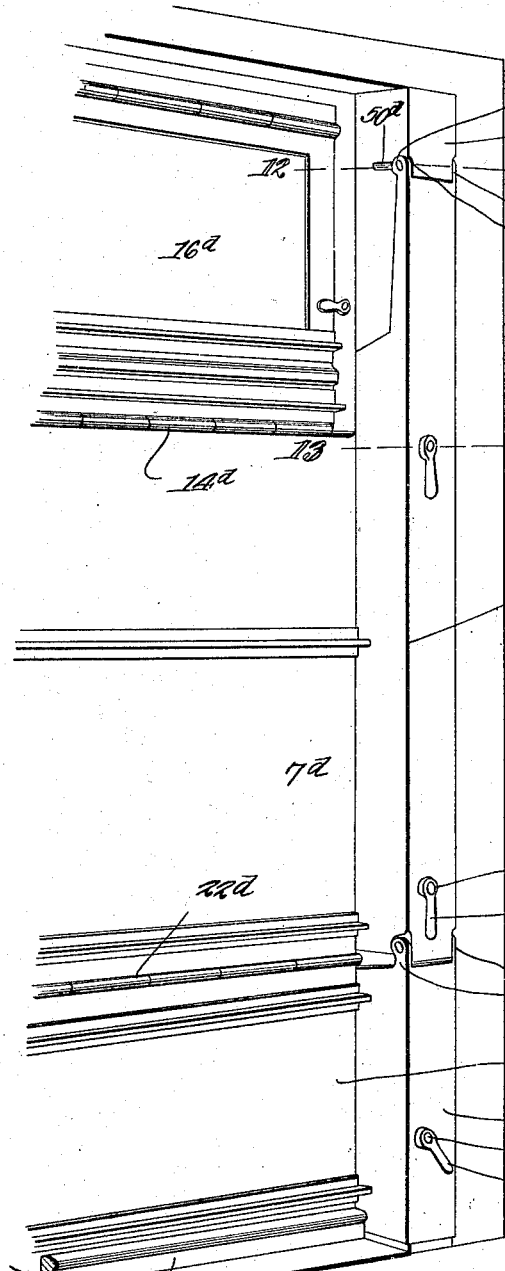

Fig. 11 is a perspective view illustrating a modified means for holding the door in closed position.

Figure 12:
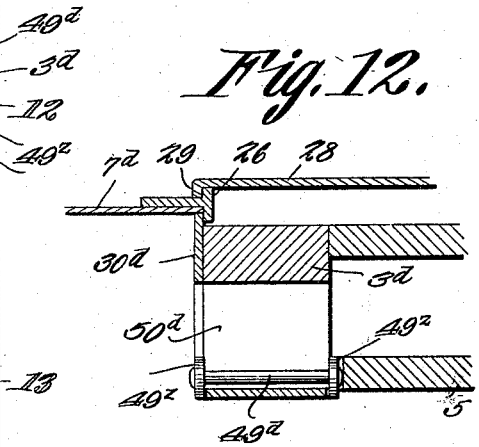
Figure 13:
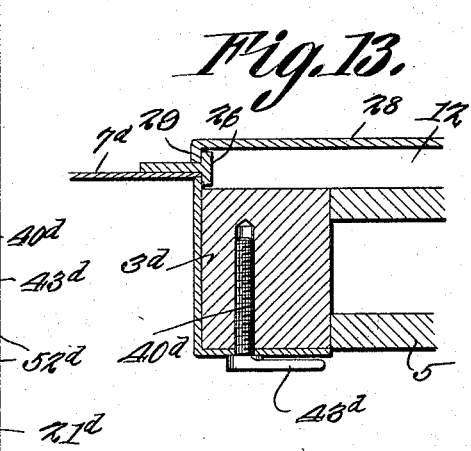

Figs. 12 and 13 are sectional views taken on the lines 12—12 and 13—13, respectively, of Fig. 11.

Fig. 14 is a fragmental elevation of another modification.

Fig. 15 is a sectional view taken on the line 15—15 of Fig. 14.

Fig. 16 is a detail view partly in section and partly broken away, of the door holding device of the modified form illustrated in Fig. 14.

Fig. 17 is a fragmental elevation of still another modification.

Figs. 18, 19 and 20 are enlarged sectional views taken on the respective section lines 18—18, 19—19 and 20—20 of Fig. 17.

Fig. 21 is a fragmental elevation of another variation.

Fig. 22 is an enlarged sectional view taken on the line 22—22 of Fig. 21.

Fig. 23 is a sectional view, similar to Fig. 22, showing a modification.

Fig. 24 is a sectional view of still another modification.

Fig. 25 is an elevation of the parts shown in Fig. 24, portions being broken away.

As illustrated, the invention is applied to a freight car, although it can be used in various other structures. The door frame of a car is designated at 1, and embodies the sill 2, posts or jambs 3, and a lintel 4. The side wall of the car is indicated at 5, and the ordinary sliding outer door is designated at 6, the same being slidable along the outer side of the wall 5 to and from the door opening.

The present invention resides in the provision of an inner closure for the door opening, and this inner closure embodies a longitudinally slidable main door 7, preferably formed of sheet metal, and having horizontal reinforcing members 8 of T-iron or equivalent stock secured to its outer face. The upper end of the door 7 is secured to a T-iron 9 whose flanges rest upon the rollers 10 mounted for rotation within the track members 11, which house said rollers, and which track members provide a track receiving the T-iron 9 to guide the same for longitudinal movement, whereby the door 7 can be shifted longitudinally to and from the opening.

A suitable housing 12, constructed of sheet metal or other suitable material, is provided upon the inner side of the wall 5 at one side of the opening, for receiving the door 7, into which said door can be moved out of the way during the time that its presence in the opening is not desired. This housing 12 is more clearly illustrated in Fig. 9, although in this figure, the housing does not extend to the upper end of the door opening. In Fig. 2, the track extends within the lintel 4, whereby the door 7 extends to the upper end of the door opening. The housing 12 is provided with lower hinged doors or gates 13 which can be opened for cleaning out the housing from time to time, to remove grain or other accumulations therefrom.

The door 7 is divided between its upper and lower ends to provide upper and lower sections, which are connected by a hinge joint 14, whereby the lower section can be swung outwardly under certain conditions. The upper section of the door 7 is provided with an opening 15 for the reception of a grain chute, or to otherwise facilitate the filling of the car with grain or other material, when the door 7 is in closed position. An auxiliary or supplemental door 16, preferably constructed of sheet metal, is provided to close the opening 15, the upper edge of the door 16 being hinged, as at 17, to the main door 7 at the upper edge of the opening 15, whereby the door 16 will swing closed by gravity. The lower edge of the door 16 overlaps the outer side of the door 7 below the lower edge of the opening 15, to shed rain, whereby the water will not run upon the inner surface of the door 7 from the outer surface of the door 16.

One or more handles 18 are preferably secured to the outer side of the door 16 in order that it can be conveniently swung open from the outside, and any suitable number of catches 19 are pivoted or otherwise carried by the outer side of the door 7 adjacent the opening 15 to swing over the door 16 when it is in closed position to prevent said door from being opened from the inside of the car.

The lower end of the door 7 terminates above or is spaced from the sill 2 of the door frame 1, to provide a discharge opening 20, which enables the grain to flow from the car through said opening 20. This opening 20 is closed by a secondary door or gate 21, preferably constructed of sheet metal, and having its lower edge pivotally mounted, as at 22, within a depression 23 of a sill plate 24 secured upon the sill 2, whereby the door 21 can be swung outwardly and downwardly upon the sill, and can be swung upwardly and inwardly to close the opening 20 with the upper free edge of the door 21 overlapping the lower end of the door 7, as seen in Fig. 2. One or more screws 25 are engaged upwardly through the sill 2, and each is adapted to threadedly engage a threaded aperture 25' of the door 21, when said door is opened, to thereby hold said door in opened position, although any other suitable means can be used for holding the door 21 down upon the sill.

Attached to the vertical side edges of the door 7 are members constructed of T-iron or equivalent stock and providing flanges 26 which assist in holding the door 7 in closed position to provide a tight joint at the edges of said door. Plates 27 are secured in any suitable manner to the inner sides of the posts 3, and upright plates 28 are spaced from but parallel with the plates 27, and are provided at their adjacent edges with outturned flanges 29 engageable with the flanges 26, as seen in Figs. 4 and 5. One of the plates 27 and one of the plates 28 are part of the housing 12, as seen at the right hand side of Figs. 4 and 5. When the door 7 is moved outwardly slightly, the flanges 26 can be disengaged from the flanges 29, to enable said door to be moved longitudinally into the housing 12, whereby the inner door will be out of the way, as when boxes of merchandise or other articles are being carried into the car.

As a means for holding the door 7 tightly against the flanges 29, to hold said door in closed position, and to provide a tight fit, whereby the grain cannot escape past the door 7, even though small grain, such as flax seed, is carried, vertical clamping bars 30 are movable inwardly and outwardly along the adjacent sides of the posts or jambs 3 of the door frame 1. Plates 31 are secured to the adjacent sides of said posts 3 against which the bars 30 slide, and said plates 31 have horizontal slots 32 extending to the outer edges of said plates, and the posts 3 are provided with horizontal grooves 33 behind the slots 32. Headed studs 34 are carried by the bars 30 and work within the slots 32, the heads of said studs engaging behind the plates 31, to hold the bars 30 assembled with said plates, although when the bars are moved outwardly past the outer edges of the plates 31, the studs 34 will be removed from the slots 32 and grooves 33, so that said bars can be swung outwardly and upwardly without difficulty, as will hereinafter more fully appear.

The plates 31 are also provided with horizontal slots 36 terminating short of the outer edges of the plates and provided at their outer ends with vertical enlargements 37, and the posts 3 have horizontal recesses 38 behind the slots 36, and horizontal grooves 39 co-extensive with the recesses 38. Horizontal screws 40 are mounted for rotation within the recesses 38, their inner ends being journaled to the plates 27, and their outer ends being journaled through face plates 42 secured to the outer sides of the posts 3, suitable handles 43 being attached to the outer ends of the said screws to facilitate the rotation thereof. A nut 44 is threaded upon each screw and has a lug 45 working in the groove 39, and said groove is provided with an enlargement 46 in alinement with the enlargement 37 of the respective slot 36. The nut 44 is provided with a finger 47 projecting through the slot 36 and received by a vertical opening 48 with which the bar 30 is provided. The screws 40 are rotatable but are prevented from shifting longitudinally in any suitable manner.

The upper ends of the bars 30 are hung loosely from the upper end portions of the plates 31, the upper ends of the bars 30 having headed rivets or studs 49 similar to the studs 34, engaged through short horizontal slots 50 with which the plates 31 are provided adjacent their upper ends, and the lower edges of the slots 50 have notches 51 for receiving the studs 49 at different positions of said bars.

When the inner door 7 is closed, so that its flanges 26 overlap the flanges 29, as seen in Fig. 4, it being understood that the bars 30 are moved outwardly out of the way, the secondary door 21 is swung upwardly and rearwardly to closed position against the lower end of the door 7, whereby to close the opening 20. When the fingers 47 of the nuts 44 project within the openings 48 of the bars 30, said bars can be forced inwardly by rotating the screws 40 in the proper direction, whereby said bars are moved toward and against the door 7, thereby forcing said door tightly against the flanges 29, the edge portions of said door being clamped between the flanges 29 and bars 30, with the flanges 26 overlapping said flanges 29 and bars 30, to provide a tight joint, and to eliminate the loosening or rattling of the door. The lower ends of the bars 30 engage the upper corners of the secondary door 21 and also hold said secondary door in closed position, as seen in Fig. 2. When the car is to be filled with grain or equivalent material, the auxiliary door 16 can be swung open upwardly, in order that the grain can be shoveled into the car, or run into the car from a chute introduced in the opening 15. After the car is filled, the door 16 is closed, and is latched by the catches or latches 19. The outer door 6 is moved to closed position across the doorway, and is sealed to prevent the unauthorized opening of the door without this being detected. When the door 6 is moved to closed position, it covers the handles 43, and prevents them from being operated from either the inside or outside of the car, whereby it is impossible to loosen the clamping bars or jaws 30. Should a tramp or maliciously inclined person hide within the car during the filling thereof, it is impossible for him to escape or to throw out merchandise from the car, because even if he can break the door 16 open, sufficient space is not allowed for him to get between the outer and inner doors, and he could only reach through the slot provided, and could not loosen or break any of the parts. The grain, merchandise or other material in bearing up against the door 7 cannot push said door outwardly, since the bars 30 are rigidly held in place, and there is no possibility of the door 7 being jostled loose.

When the car has reached its destination, and is to be emptied, the seal is first broken, and the door 6 slid to one side of the doorway out of the way. This exposes the inner door 7 and handles 43, and the auxiliary door 16 can be opened for inspecting the contents, or for removing the upper boxes or articles. If the car is filled with grain or equivalent material, the handles 43 are rotated a sufficient amount, to move the nuts 44 outwardly, whereby the bars 30 are moved outwardly enough so that the door 21 can clear the lower ends of the bars 30, to permit said door 21 to move outwardly and downwardly away from the opening 20, thus permitting the grain to flow through the opening 20 over the door 21 into a chute or other receptacle provided for that purpose. Ordinarily, the fingers 47 in projecting through the slots 36 will be prevented from swinging upwardly or downwardly, although they can move longitudinally within said slots, this up and down movement of the fingers 47 also being prevented by the lugs 45 working in the grooves 49. When it is desired to open the door 7, the screws 40 are rotated further to move the nuts 44 outward further adjacent the outer ends of the slots 36, which permits the door 7 to move outwardly under the pressure of the contents of the car when said contents bears against the door. The bars 30 can now be loosened, in order that they can be swung outwardly and upwardly out of the way, since when the fingers 47 are brought into the enlargements 37 of the slots 36, with the lugs 45 in the enlargements 46 of the grooves 39, said fingers 47 can be swung upwardly out of the openings 48, thereby permitting the bars 30 to be moved outwardly to disengage the studs 34 thereof from the slots 32, whereby said bars can be swung outwardly and upwardly. This permits the lower section of the door to swing outwardly and upwardly, whereby boxes and other articles can be removed from the car. When sufficient matter has been removed from the car, the door 7 can be swung back to closed position, and then shifted into the housing 12 out of the way. The bars 30 can be quickly returned into place and the fingers 47 engaged in the openings 48 thereof. The slots 50 permit the studs 49 to move outwardly, and the notches 41 will hold said studs 49 at different positions.

In the modification illustrated in Fig. 6, the secondary door $21^a$ is provided at its free edge with an outstanding flange $21^z$, the door $21^a$ being adapted to overlap the lower end of the main door $7^a$, and the door $21^a$ being mounted for swinging movement within a depression $23^a$ of the sill plate $24^a$. The outer edge of the sill plate $24^a$ has a depending apron $24^z$ provided with a rabbet for receiving the flange $21^z$ when the door $21^a$ is swung downwardly out of the way. A prop $25^a$ is pivoted, as at $25^x$, to the plate $24^a$, and can be swung upwardly under the flange $21^z$ to hold the door $21^a$ in closed position, the plate $24^a$ having a recess $25^y$ to receive the prop $25^a$ when it is swung downwardly out of the way, to thus permit the door $21^a$ to be swung open.

Figs. 7 and 8 illustrate the door $7^b$ as being hinged to the T-iron, as at $14^b$, whereby the door, as a whole can be swung outwardly, and the bars $30^b$ are mounted and controlled the same as the bars 30 above described, and are used for holding the door $7^b$ only in closed position. In this structure, the secondary door or gate $21^b$, is hinged, as at $22^b$, to the lower end of the door $7^b$, so as to swing downwardly to close the opening between the lower end of the door $7^b$ and the sill 2. Depending arms or extensions $25^b$ are pivotally connected by means of links 52 to the lower ends of the bars $30^b$ to swing against the door $21^b$ for holding said door $21^b$ in closed position. The lower ends of the extensions $25^b$ have notches 53 for the reception of a vertically slidable locking bar 54 movable within a recess 55 with which the sill 2 is provided. When the door $21^b$ is closed and the extensions $25^b$ swung downwardly against the door $21^b$, the bar 54 can be raised to engage the notches 53, thereby to hold the extensions $25^b$ and door $21^b$ in closed position. The bar 54 can be raised in any suitable manner, such as by means of a screw 56 carried by the sill 2 and provided with a handle 57 below said sill, and if need be additional screws 58 can be employed for raising the bar 54 should said bar stick or bind when adjusted by the screw 56 alone. Other means can be employed for raising or lowering said bar 54. Those parts which are the same as those above described and which have the same reference characters need not be described in detail again.

In Fig. 9, the door $7^c$ is illustrated as being moved into the housing 12, and the doorway extends above said door $7^c$, to provide an opening above the inner door, when such an arrangement is desired. The other parts are practically the same as those above described.

The structure shown in Figs. 11, 12 and 13 is simplified, and the door $7^d$ has the hinge $14^d$, as shown in the first form, the upper section of the door having an auxiliary door $16^d$. The secondary door $21^d$ is hinged, as at $22^d$, to the lower end of the door $7^d$. The door holding member $30^d$ is of angular cross section so that its flanges overlap the outer side of the post $3^d$ and that side thereof adjacent the opposite post, the lower end of the member $30^d$ terminating above the door $21^d$. The upper end of the member $30^d$ has ears $49^z$ with which a pin $49^d$ is engaged, said pin sliding within a slot $50^d$ provided in the post $3^d$ adjacent its upper end, whereby the member $30^d$ can slide slightly, as well as having a swinging movement. An angular extension $25^d$ has ears $52^d$ pivoted to the lower end of the member $30^d$, and said extension fits the post $3^d$ the same as the member $30^d$. The member $30^d$ holds the door $7^d$ in closed position, while the extension $25^d$ holds the door $21^d$ in closed position, although a bar $54^d$ similar to the bar 54 above described, can be used for holding the door $21^d$. The member $30^d$ and its extension $25^d$ are held against the post $3^d$ to hold the doors closed, by means of screws $40^d$ passing through apertures in the outer flanges of said member and extension and threaded into the post, the outer ends of said screws having heads or handles $43^d$ for rotating them, and to hold said member and extension in place. When the handles $43^d$ are covered by the outer door, they cannot be rotated to loosen the screws 40ᵈ. When the outer door is moved out of the way, the screws 40ᵈ of the extensions 25ᵈ can be removed, permitting said extensions to swing out of the way, whereby the door 21ᵈ can be opened, the same as when the extensions 25ᵇ of the structure shown in Figs. 7 and 8 are swung outwardly to enable the door 21ᵇ to swing open. When the screws 40ᵈ of the members 30ᵈ are moved, the door 7ᵈ can swing outwardly. The inwardly projecting flanges of the members 30ᵈ and extensions 25ᵈ are arranged to bear against the doors to hold them in place, as seen in Figs. 12 and 13.

Figs. 14, 15 and 16 illustrate another simplified construction. In this form, a vertical rotary post 30ᵉ is mounted at each side of the door way, the lower end thereof being spaced from the sill 2ᵉ, and having an extension 30ᶻ projecting downwardly through said sill. The upper end of the post 30ᵉ has a trunnion 49ᵉ journaled in the lintel 4ᵉ. The post 30ᵉ has a flange or jaw 30ˣ to engage the door 7ᵉ, as seen in Fig. 15, whereby to hold said door in closed position. A tubular member or sleeve 25ᵉ is rotatable upon the extension 30ᶻ between the lower end of the post 30ᵉ and sill 2ᵉ, and is provided with a reduced tubular extension 25ʷ projecting downwardly through the sill. The sleeve 25ᵉ, the same as the post 30ᵉ, has a flange or jaw 30ˣ to engage the secondary door 21ᵉ. The post 30ᵉ and sleeve 25ᵉ can be rotated from below the sill. One way of rotating said parts, as illustrated, embodies gear wheels 60 secured to the lower ends of the extensions 25ʷ and 30ᶻ, and meshing with gear wheels 61 which in turn mesh with segments 62 carried by levers 63. When said levers are swung, the sleeve 25ᵉ and post 30ᵉ can be rotated independently, for loosening the secondary door 21ᵉ and main door 7ᵉ. The post or sleeve in being rotated, will move the flange 30ˣ away from the door to loosen the door, and permits the same to swing outwardly.

Figs. 17, 18, 19 and 20 illustrate a construction generally resembling that shown in Figs. 14, 15 and 16, but having differences in details. At each side of the door way, there is a vertical post 65, which may be constructed of wood, and within which is disposed a metallic rod or shaft 66. Secured to the post 65 is an arcuate face plate 67 along which is movable a vertical plate 30ᶠ, one edge of which is adapted to engage the door 7ᶠ and hold it in closed position. An extension plate 25ᶠ is disposed below the plate 30ᶠ, to hold the secondary door 21ᶠ in closed position. The face plate 67 has arcuate horizontal slots 69, and each of the plates 25ᶠ and 30ᶠ has inwardly projecting studs 68 projecting through certain slots 69 and provided with rollers 70 bearing against the inner side of the plate 67 and working in arcuate recesses 71 with which the post 65 is provided. This holds the plates 25ᶠ and 30ᶠ assembled with the post 65 and plate 67. A rocker 72 is provided for each of the plates 30ᶠ and 25ᶠ, and is mounted for rotation upon the shaft 66 within a recess 73 with which the post 65 is provided, and said rocker is attached to the respective plate 30ᶠ or 25ᶠ, the plate 67 having a slot 74 for receiving the rocker 72. A short shaft 75 is journaled through each of the plates 30ᶠ and 25ᶠ, and to the respective rocker 72, and has a pivoted handle 76 at its outer end and a pinion 77 upon its inner end meshing with a segment 78 secured to the post 65 within the recess 73. The plates 25ᶠ and 30ᶠ carry set screws 79 which can be tightened when said plates are in position to hold the doors closed, to thereby prevent the plates from being loosened. When the set screws 79 are loosened, this being readily done when the outer door is moved out of the way, the handles 76 can be rotated to rotate the shafts 75 and pinions 77, whereby the door holding plates are moved either away from or toward the doors. The plate 30ᶠ holds the door 7ᶠ in closed position, while the plate 25ᶠ holds the secondary door 21ᶠ in closed position, and enables the secondary door to be released before the main door 7ᶠ.

Another variation is illustrated in Figs. 21 and 22. The post 3ᵍ has an inner recess 3ˣ for receiving the clamping bar 30ᵍ and extension 25ᵍ, but since the extension is similar to the bar 30ᵍ, said bar only will be described in detail. The bar 30ᵍ holds the door 7ᵍ in closed position, while the extension 25ᵍ is for holding the secondary door 21ᵍ, for the purposes above described. A plate 27ᵍ is secured to the inner side of the post 3ᵍ and projects over the recess 3ˣ, and a plate 31ᵍ is secured to that side of the post adjacent the opposite post. The bar 30ᵍ is movable along the plate 31ᵍ within the recess 3ˣ across the edge of the plate 27ᵍ and said bar 30ᵍ has a flange 30ᵛ adapted to overlap the edge of the door 7ᵍ. The bar 30ᵍ has bores 30ᵗ receiving the extensions 40ᵗ of screws 40ᵍ threaded within the post 3ᵍ and extending through a face plate 42ᵍ attached to the outer side of the post. The outer ends of said screws have handles 43ᵍ, and the door frame has recesses 30ˢ for receiving the ends of the bar 30ᵍ and extension 25ᵍ when said parts are moved into place to clamp the doors against the flange 29, whereby to assist in holding said bar and extension in place. The screws 40ᵗ are adapted to force the bar 30ᵍ inwardly to clamp the door 7ᵍ between the flanges 29 and 30ᵛ. When the screws 40ᵍ are loosened to remove the extensions 40ᵗ from the bar 30ᵍ, the bar 30ᵍ can move outwardly, and then when the extensions 40ᵗ are withdrawn from the bores 30ᵗ, the bar 30ᵍ can be moved longitudinally of the car within the recess $30^x$, to thus retract the flange $30^v$ from the door $7^g$, so that said door can be swung open.

In the modification illustrated in Fig. 23, the door holding member $30^h$ is mounted for rocking movement upon a vertical shaft $66^h$ disposed within the recess $3^w$ of the post $3^h$, said member $30^h$ being adapted to swing against the door $7^h$ to hold it against the flange 29. A screw $40^h$ carried by the post $3^h$ is adapted to bear against the member $30^h$ to hold it in place against the door, and to clamp the door in position. When the screw $40^h$ is loosened, the member $30^h$ can be swung out of the way within the recess $3^w$ to release the door and permit it to swing open.

Figs. 24 and 25 illustrate a means for actuating the door holding bar $30^i$ whereby it is moved in two directions by operating the handle $43^i$. A screw $40^i$ being said handle, is threaded within the post $3^i$, and has secured to its inner end a cam 80 bearing against the bar $30^i$. Said cam is disposed within a U-shaped member 81 whose ends straddle the edge of the bar $30^i$, whereby when the screw $40^i$ is moved inwardly or outwardly, the member 81 will be moved in a similar direction with the cam 80, to move the bar $30^i$ correspondingly. A link 82 is engaged with the cam 80 and one end works within a slot 83 with which the bar $30^i$ is provided. When the screw 41 is rotated in one direction, the cam 80 forces the bar $30^i$ into a position to overlap the door $7^i$, and said screw moves inwardly so that the door will be clamped between the bar $30^i$ and flange 29, as seen in Figs. 24 and 25. To loosen the door, the screw is rotated in the other direction, whereby the cam 80 is moved upwardly, as seen in Fig. 25, but will hold the bar $30^i$ in engagement with the door during the greater portion of the outward movement of the screw $40^i$, whereby the door $7^i$ will move outwardly with the bar $30^i$, but when the cam 80 starts to leave the bar $30^i$ during the completion of the movement of the screw $40^i$, the links 82 striking the end of the slot 83 will pull the bar $30^i$ away from the door, thus releasing the door, and permitting it to swing open. The bar $30^i$ is thus first moved outwardly, and then moved away from the door way and door, and when the door is in closed position, the bar 31, by proper rotation of the screw $40^i$, will first be moved into position to overlap the door $7^i$, and then will be moved inwardly to clamp said door against the flange 29.

Having thus described the invention, what is claimed as new is:—

1. A door structure embodying a pair of plates having flanges, a door adapted to rest against said flanges and having T-members at its side edges providing opposite flanges certain of which are adapted to overlap the aforesaid flanges, and means for overlapping the other flanges of the door and moving said door toward and clamping it against the first mentioned flanges.

2. The combination with a door frame, of a pair of members at the inner side thereof at the opposite sides of the door way, a track, a door suspended from said track and slidable to and from the door way between the door frame and one of said members, the edge portions of the door being adapted to rest against said members, the door having a hinged portion adapted to be swung outwardly away from said members, and means for forcing said door including said portion thereof tightly against said members.

3. A door structure embodying a pair of members, a main door having a portion to rest against said members and movable outwardly through the door way, a secondary door adapted to rest against said members at one end of the main door and movable outwardly through the door way, and means for clamping both doors against said members and operable for first releasing the secondary door with the main door still held against said members and then releasing the main door for outward movement.

4. The combination with a door frame, of a pair of members at the opposite sides of the door way, a main door having a portion to rest against said members and movable outwardly through the doorway, the lower end of the main door being spaced from the sill of the frame to provide an opening, a secondary hinged door for closing said opening and adapted to rest against said members and to move outwardly through the door way, and means for clamping both doors against said members and operable for first releasing the secondary door for outward movement with the main door held in position and then releasing the main door for outward movement.

5. The combination with a door frame, of a pair of members at the inner side thereof at the opposite sides of the door way, a track, a main door suspended from said track and slidable to and from the door way, the main door having a hinged portion adapted to rest against said members and to swing outwardly through the door way, a secondary door adapted to rest against said members at one end of said hinged portion and movable outwardly through the door way, and means for clamping the hinged portion and secondary door against said members and operable for first releasing the secondary door for outward movement with the said portion in position and then releasing said portion for outward movement.

6. The combination with a door frame, of a pair of members at the opposite sides of the door way, a track, a main door suspended from said track and slidable to and from the door way, said door having a hinged portion to rest against said members and swingable outwardly through the door way, said portion being spaced above the sill of the frame to provide a lower opening, a secondary hinged door for closing said opening to rest against said members and swingable outwardly through the door way, and means for clamping said portion and secondary door against said members and operable for first releasing the secondary door for outward movement with said portion in position and then releasing said portion.

In testimony that I claim the foregoing as my own, I have hereto affixed my signature in the presence of two witnesses.

JOHN LAYTON GUERRANT.

Witnesses:
HENRY O. BENTE,
ARTHUR L. CRANDALL.

Copies of this patent may be obtained for five cents each, by addressing the "Commissioner of Patents, Washington, D. C."